United States Patent [19]

Chadwick

[11] 3,998,099
[45] Dec. 21, 1976

[54] EGG COOKING INDICATOR AND METHOD OF PRODUCING SAME

[76] Inventor: Duane G. Chadwick, 555 E. 3rd North, Logan, Utah 84321

[22] Filed: Aug. 28, 1975

[21] Appl. No.: 608,570

[52] U.S. Cl. .............................................. 73/374
[51] Int. Cl.² ........................................ G01K 1/12
[58] Field of Search ..................................... 73/374

[56] References Cited

UNITED STATES PATENTS

| | | | |
|---|---|---|---|
| 1,983,166 | 12/1934 | Chaney et al. | 73/374 |
| 2,051,540 | 8/1936 | Chaney | 73/374 |
| 2,246,241 | 6/1941 | Chaney et al. | 73/374 |
| 2,300,000 | 10/1942 | Mayers | 73/374 X |
| 2,313,688 | 3/1943 | Wappner et al. | 73/374 |
| 2,316,677 | 4/1943 | Edwards et al. | 73/374 |
| 2,430,290 | 11/1947 | Hann | 73/374 |

*Primary Examiner*—Richard C. Queisser
*Assistant Examiner*—Frederick Shoon
*Attorney, Agent, or Firm*—B. Deon Criddle

[57] ABSTRACT

A device having heat transfer characteristics generally corresponding to an egg and including an indicating means to indicate when a desired degree of cooking of an egg, of any size, subjected to the same treatment as the device, has been achieved. The device is produced by suspending a properly insulated thermometer in a transparent tube with an air space substantially surrounding the thermometer and thereafter sealing the open end of the tube.

2 Claims, 4 Drawing Figures

EGG COOKING INDICATOR AND METHOD OF PRODUCING SAME

BRIEF DESCRIPTION OF THE INVENTION

1. Field of the Invention

This invention relates to devices for indicating how well boiled eggs are cooked.

2. Prior Art

Various devices have been proposed in the past as a means for governing the length of time that an egg should be boiled. Most of the devices with which I am familiar have comprised timers that merely indicate when an egg has been emersed in boiling water for a period of time and it is merely assumed that when a pre-set time has expired the egg is cooked to the desired consistency. For this purpose, spring-wound clock timers, various hourglass type structures, and many other devices have been developed. While these previously known timer-devices have been somewhat satisfactory, since based on prior experience, they frequently warn the user that the egg is cooked at least approximately to the extent desired, they do not allow the size of the egg, temperature of the egg at the start of the cooking operation, the cooking temperature of the water, the altitude at which the water is being boiled, or other factors that affect the cooking time, to be considered. In U.S. Pat. No. 2,430,290, there is shown an instrument that is adapted to be placed in the water in which an egg is to be boiled, and that will respond to temperature increases of the water to indicate on a scale, the degree of cooking of an egg placed in the water for cooking purposes. The instrument shown in the patent comprises a thermometer firmly set into a transparent casing and with the temperature responsive end surrounded by a suitable insulating material that fills the end of the casing. The insulating material keeps the mercury in the thermometer from being heated too rapidly.

SUMMARY OF THE INVENTION

It is a principal object of the present invention to provide an egg cooking indicator that will react to temperature increases of water in which an egg is cooked, such that the degree of cooking of the egg can be determined by reading the scale of the instrument. Other objects are to provide such an instrument that can be more easily constructed and more easily and reliably calibrated than has been heretofore possible for instruments intended to accomplish the same purpose.

Still other objects are to provide such a timing device that is subject only to conductive heat transfer and that is not affected by radiated heat energy.

Principal features of the invention include a cylindrical, transparent housing having both ends closed and with a liquid thermometer mounted therein. The reservoir end of the mercury thermometer is mounted within an epoxy insulating material which serves as a thermal mass heat sink. The thermometer and epoxy insulating material are suspended within the housing such that an air space is provided therearound. A calibrated backing member positions the thermometer as the epoxy is set therearound and suspends the thermometer and epoxy within the housing. A portion of the housing adjacent to the epoxy and the reservoir end, i.e. the temperature responsive end, of the thermometer is silvered on the inside end thereof to prevent thermometer reaction in response to radiated heat energy. The calibrated backing member provides indicia thereon to cooperate with the liquid of the thermometer in indicating when desired degrees of cooking have been achieved for eggs of different sizes.

Additional objects and features of the invention will become apparent to those skilled in the art, from the following detailed description and claims, taken with the accompanying drawings.

THE DRAWING

In the drawing:

FIG. 1 is a perspective view, showing the egg cooking indicator of the invention, as positioned in a pan of water in which eggs are being cooked;

FIG. 2, a front elevation view of the egg cooking indicator of the invention;

FIG. 3, a vertical section taken on the line 3—3 of FIG. 2; and

FIG. 4, a transverse section taken on the line 4—4 of FIG. 2.

DETAILED DESCRIPTION

Figure 1:
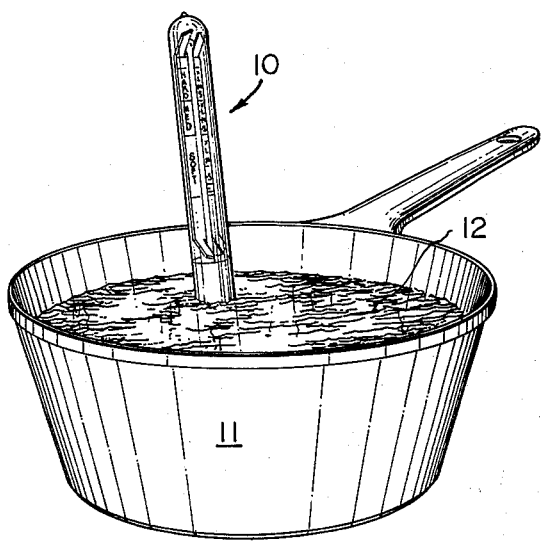
Figure 4:
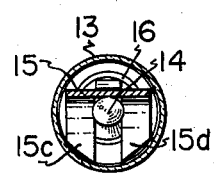
Figure 2:
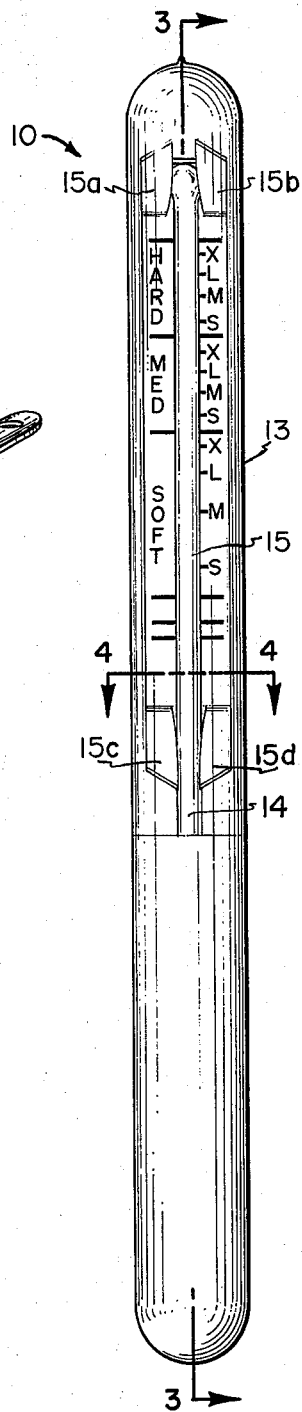
Figure 3:
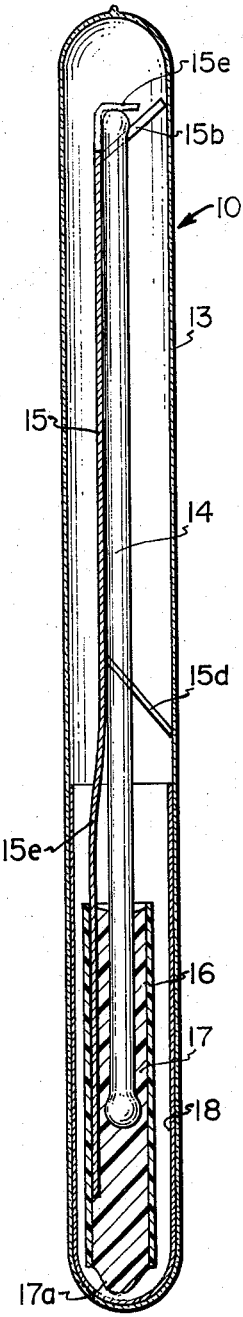

Referring now to the drawing:

In the illustrated preferred embodiment, the egg cooking indicator of the invention is shown generally at 10. As shown best in FIG. 1, the timer is adapted to be positioned in a pan 11 containing water 12 in which one or more eggs is to be boiled. The indicator 10 includes a housing 13 that is preferably made of glass and that is cylindrical, with both ends closed. Housing 13 may be formed by closing the open end of a tube in which the other components of the indicator 10 are positioned.

A liquid bulb-type thermometer 14 is carried by a backing member, shown generally at 15. Upper side tabs 15a and 15b of the backing member 15 are adapted to be angularly bent from the backing member to engage and extend beyond opposite sides of the thermometer stem. Intermediate the length of the thermometer a pair of lower side tabs 15c and 15d are angularly bent from the backing member 15 to similarly engage opposite sides of the stem of the thermometer and to project therepast into engagement with the wall of housing 13. A narrow portion 15e of the backing member is then bent away from the thermometer and extends beyond the bulb end of the thermometer and into a sleeve 16 that is filled with an epoxy 17. The backing member 15, at its upper end, is made just wide enough to fit within the housing 13 such that opposite sides of the backing member will engage the wall of the housing 13 when the projecting ends of the tabs 15a, 15b, 15c, and 15d, are in engagement with the housing wall. So arranged, the thermometer fits snugly within the housing 13 although some vertical adjustment can be made and the lower end of the thermometer, i.e. the bulb end of the thermometer, and the narrower lower end of the backing member, are potted in the epoxy 17, with the sleeve 16 and the epoxy and members therein held a spaced distance away from the wall of housing 13. To insure proper positioning of the thermometer with regard to the cooking level indicia on the backing member, the thermometer is positioned on the backing member, between the tabs 15a–15d and is moved longitudinally to the proper position. Central upper tab 15e is then bent over the end of the thermometer to prevent further longitudinal movement in the upward direction. The epoxy is then poured into sleeve 16 while the thermometer is held firmly against tab 15e. The epoxy is formed to have a depending nipple 17a, so that if any bottom portion of the suspended backing should contact the housing it will be only a point contact by the insulating material and no significant heat transfer will occur thereby. It is preferred however that a total dead air space be provided between the temperature responsive end of the thermometer and the wall of the housing.

The indicia on the backing member forms a universal temperature responsive gauge applicable to the cooking of eggs. As such, no conversion is required by the user from scales normally found on thermometers, i.e. Farenheit, centigrade, inches, M.M., C.M., etc.

Because the epoxy insulating material is at one end of the thermometer and consequently is positioned below the center line of the housing the center of gravity of the unit is therefore below the center line of the housing. Therefore because the housing has a rounded bottom, the housing will always be self-righting so that the indicia scale can be readily observed.

In addition to providing a scale and acting as a suspension member, the rigid backing member also strengthens the thermometer stem to reduce the possibility of breakage if the unit is shaken, bumped or dropped.

The lower portion of housing 13 is preferably provided with a coating 18 of metallic silver or the like. It has been found that the silver coating 18 will allow conductive heating of the air space surrounding the bulb end of the thermometer and will allow for controlled heating of the epoxy, while at the same time preventing the effect of radiant heating on the thermometer.

The backing member, on the side against which the thermometer rests, has indicia thereon applicable to soft, medium, and hard cooked levels for boiled eggs and each cooking level is further graduated according to egg size. Thus, a small, medium, large, or extra large egg can be cooked to a soft condition by removing the egg when the liquid of the indicator of the invention reaches a level corresponding that cooking level and to the size of the egg.

Similarly, it can be determined when eggs of other sizes reach medium or hard levels of cooking.

For best results the indicator 10 should preferably be subjected to the same conditions as the egg to be cooked for some period prior to the actual cooking. For example, if the egg or eggs are kept in a refrigerator prior to cooking, the indicator should preferably also be placed in the refrigerator to allow the thermometer temperature to be the same as the inside temperature of the egg. This will better insure a uniform temperature rise between the inside of the egg and the thermometer inside housing 13.

Although a preferred form of my invention has been herein disclosed, it is to be understood that the present disclosure is by way of examples and that variations are possible without departing from the subject matter coming within the scope of the following claims, which claims I regard as my invention.

I claim:
1. An egg cooking indicator comprising
   a transparent closed housing;
   a thermometer having a heat responsive end;
   a backing member to which said thermometer is affixed;
   insulating material carried by and surrounding the heat responsive end of the thermometer and said insulating material serving to affix the thermometer to the backing member; and
   means suspending said thermometer in the housing whereby an air space substantially surrounds the insulating material carried by and surrounding the heat responsive end of the thermometer, and means comprising edges of the backing member and tabs bent from the backing member to engage sides of the thermometer and to extend beyond the thermometer into engagement with the wall of the housing.
2. An egg cooking indicator as in claim 1, wherein the inside of the housing surrounding the temperature responsive end of the thermometer is coated with silver.

* * * * *